(12) United States Patent
Fujita

(10) Patent No.: US 9,723,201 B2
(45) Date of Patent: Aug. 1, 2017

(54) IMAGE CAPTURING APPARATUS AND CONTROL METHOD THEREFOR

(71) Applicant: CANON KABUSHIKI KAISHA, Tokyo (JP)

(72) Inventor: Atsushi Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/839,787

(22) Filed: Aug. 28, 2015

(65) Prior Publication Data

US 2016/0073011 A1     Mar. 10, 2016

(30) Foreign Application Priority Data

Sep. 5, 2014   (JP) ................. 2014-181595
Sep. 5, 2014   (JP) ................. 2014-181596

(51) Int. Cl.
| | | |
|---|---|---|
| H04N 5/262 | (2006.01) | |
| H04N 5/232 | (2006.01) | |
| G06T 11/00 | (2006.01) | |
| G06T 11/60 | (2006.01) | |
| H04N 5/265 | (2006.01) | |

(52) U.S. Cl.
CPC ....... *H04N 5/23222* (2013.01); *G06T 11/001* (2013.01); *G06T 11/60* (2013.01); *H04N 5/23229* (2013.01); *H04N 5/265* (2013.01); *H04N 5/2621* (2013.01)

(58) Field of Classification Search
None
See application file for complete search history.

(56) References Cited

U.S. PATENT DOCUMENTS

| | | |
|---|---|---|
| 2013/0058633 A1 | 3/2013 | Hoshino et al. |
| 2014/0232911 A1 | 8/2014 | Takaiwa |
| 2015/0063785 A1* | 3/2015 | Lee .............. G11B 27/031 386/280 |

FOREIGN PATENT DOCUMENTS

| | | |
|---|---|---|
| EP | 1653472 A2 | 5/2006 |
| JP | 2002-218384 A | 8/2002 |
| JP | 2006-262135 A | 9/2006 |

OTHER PUBLICATIONS

European Search Report issued on Jan. 28, 2016, which is enclosed, that issued in the corresponding European Patent Application No. 15181738.4.

* cited by examiner

*Primary Examiner* — Stephen Coleman
(74) *Attorney, Agent, or Firm* — Cowan, Liebowitz & Latman, P.C.

(57) ABSTRACT

There is provided an image capturing apparatus. An image capturing unit captures a plurality of moving images. A control unit adds, to each of the plurality of moving images, a first special effect which is common to all of the plurality of moving images, and adds, to each of one or more of the plurality of moving images, a second special effect which is determined on a moving image-by-moving image basis. A generating unit generates a joined moving image constituted by the plurality of moving images to which the special effects have been added by the control unit.

7 Claims, 18 Drawing Sheets

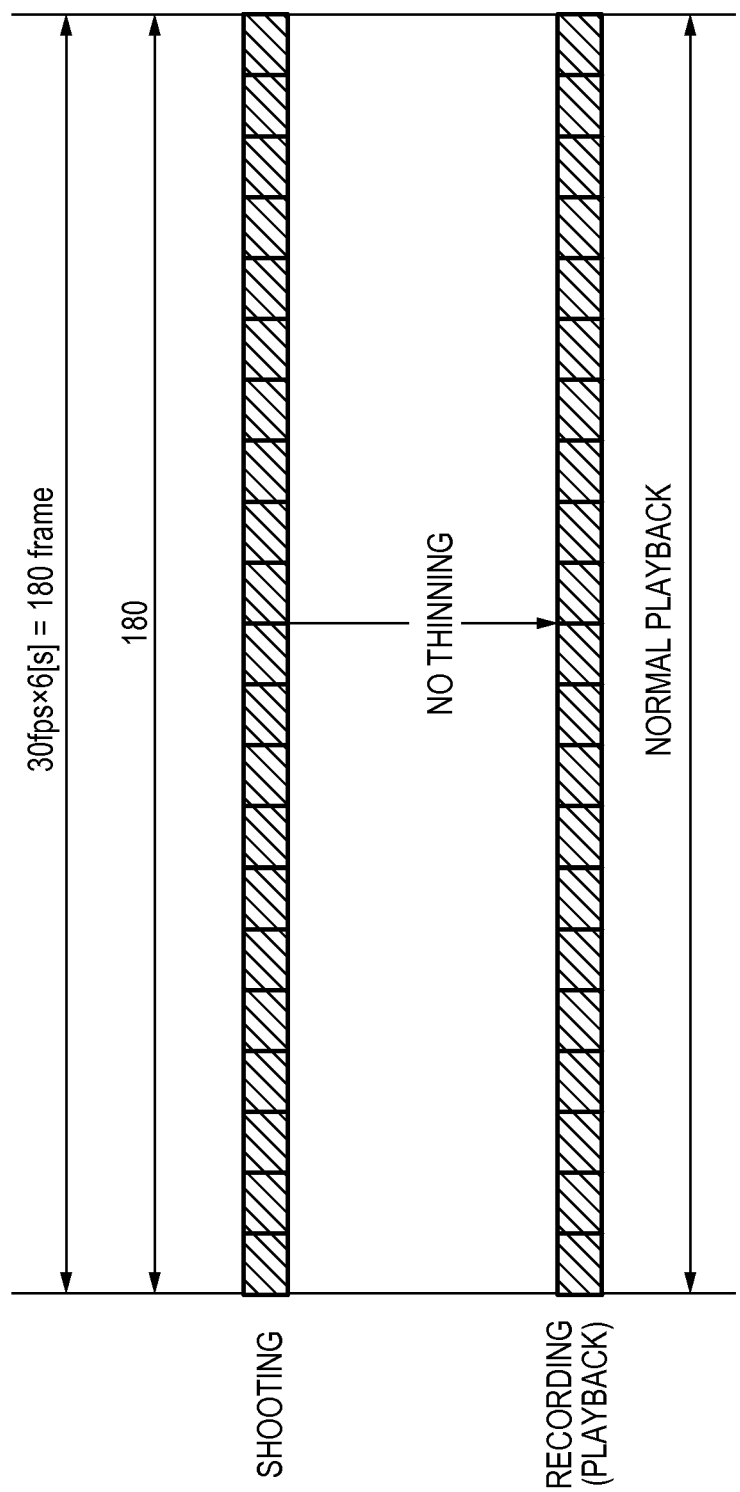

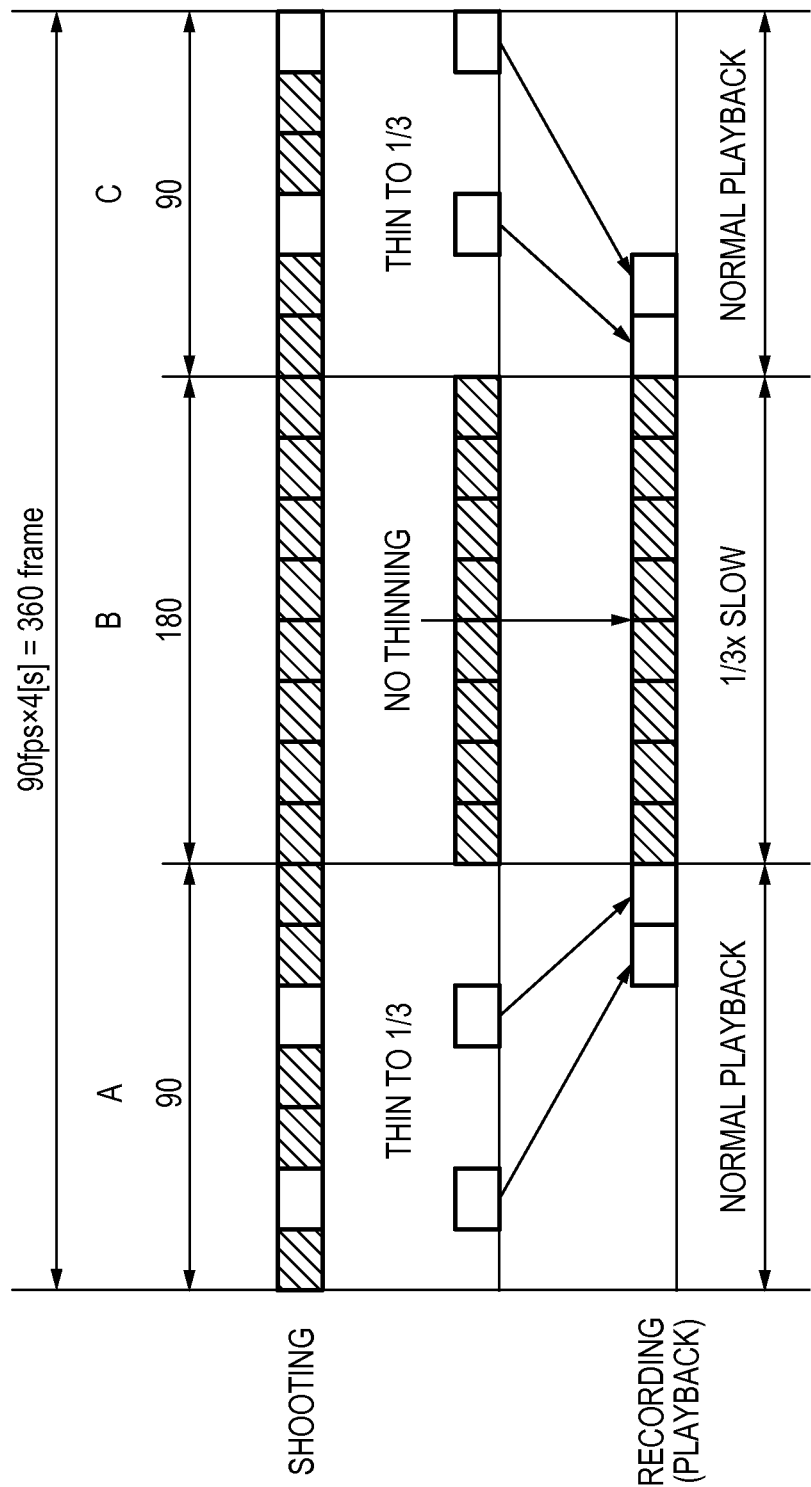

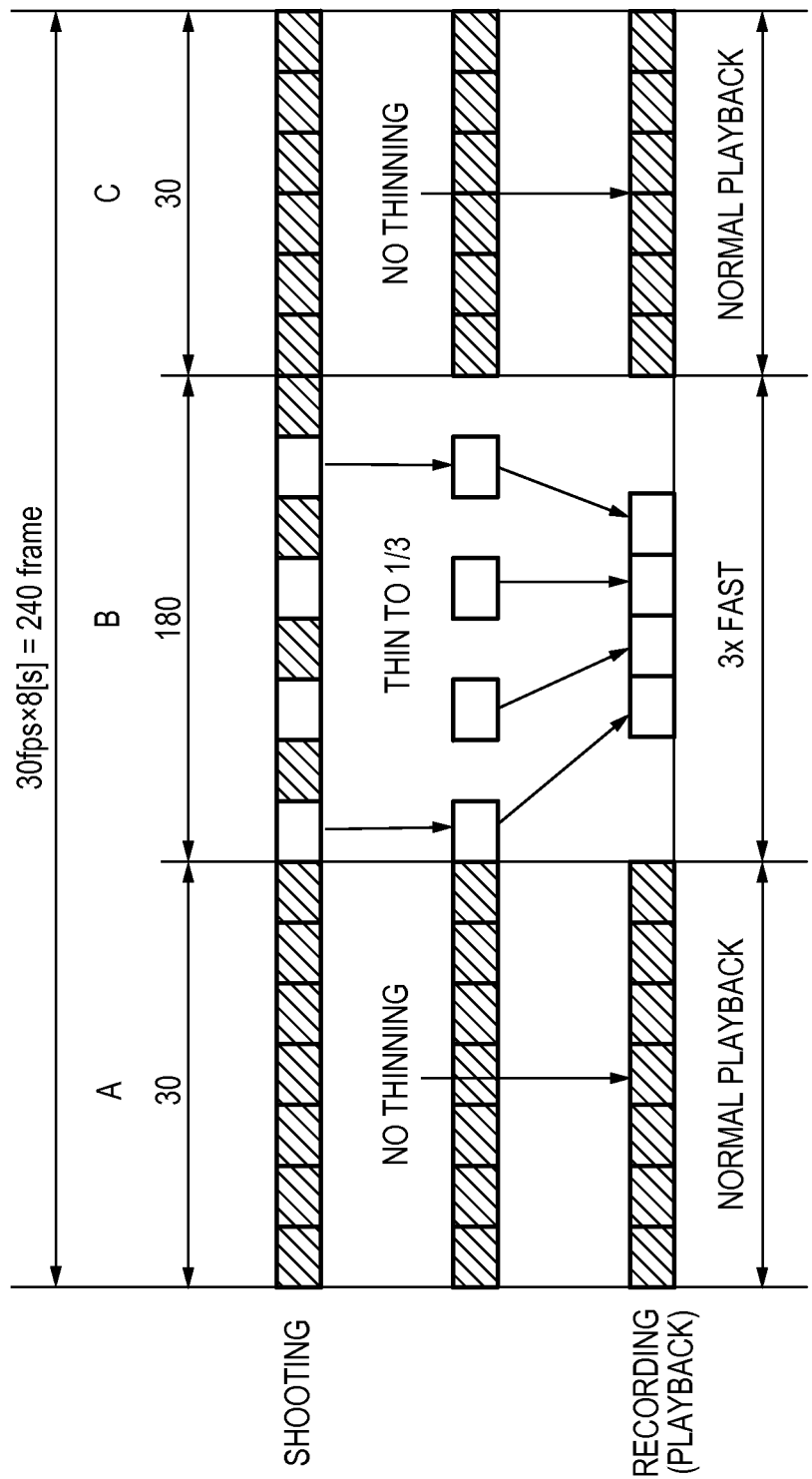

F I G. 5

| CLASSIFICATION | TYPE (SPECIAL EFFECT GROUP) | SPECIAL EFFECT |
|---|---|---|
| SPECIAL EFFECT PROCESS A GROUP (APPLY COMMON EFFECT AMONG CHAPTERS) | (1) COLOR/TONE CONVERSION FILTERING EFFECT | NONE/BLACK AND WHITE (HIGH-CONTRAST)/... |
| | (2) TEMPLATE SYNTHESIS EFFECT | NONE/DECORATIVE FRAME/LIMB DARKENING/... |
| SPECIAL EFFECT PROCESS B GROUP (DETERMINE EFFECT CHAPTER-BY-CHAPTER) | (3) VARIABLE FRAMERATE EFFECT | NONE (NORMAL)/SLOW-MOTION (PARTIAL)/ FAST-FORWARD (PARTIAL)/... |
| | (4) AFTERIMAGE EFFECT | NONE/LOW/MEDIUM/HIGH/... |

※ WHEN P = 100

F I G. 13

|  | SUBJECT MOVING | | | SUBJECT NOT MOVING | | |
|---|---|---|---|---|---|---|
|  | AREA A | | | AREA B | | |
| IMAGE CAPTURING APPARATUS MOVING | SLOW-MOTION -PRIORITY | SLOW-MOTION -PRIORITY | NORMAL- PRIORITY | SLOW-MOTION -PRIORITY | SLOW-MOTION -PRIORITY | NORMAL- FIXED |
|  | AREA C | | | AREA D | | |
| IMAGE CAPTURING APPARATUS NOT MOVING | SLOW-MOTION -PRIORITY | FAST-FORWARD –PRIORITY | FAST-FORWARD –PRIORITY | SLOW-MOTION -PRIORITY | NORMAL- PRIORITY | NORMAL- PRIORITY |
|  | PERSON | PRIMARY SUBJECT ASIDE FROM PERSON PRESENT | NO PRIMARY SUBJECT | PERSON | PRIMARY SUBJECT ASIDE FROM PERSON PRESENT | NO PRIMARY SUBJECT |

F I G. 14

|  | NORMAL | SLOW-MOTION | FAST-FORWARD |
|---|---|---|---|
| NORMAL - PRIORITY | 60 | 20 | 20 |
| SLOW-MOTION - PRIORITY | 20 | 60 | 20 |
| FAST-FORWARD - PRIORITY | 20 | 20 | 60 |
| NORMAL - FIXED | 100 | 0 | 0 |

[%]

F I G. 18

| | Chapter1 | Chapter2 | Chapter3 | Chapter4 |
|---|---|---|---|---|
| (1) COLOR/TONE CONVERSION FILTERING EFFECT | FILTER 1 | FILTER 1 | FILTER 1 | FILTER 1 |
| (2) TEMPLATE SYNTHESIS EFFECT | TEMPLATE 5 | TEMPLATE 5 | TEMPLATE 5 | TEMPLATE 5 |
| (3) VARIABLE FRAMERATE EFFECT | x1.0 | x3.0 | x1/3 | x2.0 |
| (4) AFTERIMAGE EFFECT | NONE | MEDIUM | NONE | LOW |

IMAGE CAPTURING APPARATUS AND CONTROL METHOD THEREFOR

BACKGROUND OF THE INVENTION

Field of the Invention

The present invention relates to an image capturing apparatus and a control method therefor.

Description of the Related Art

With the recent advent of moving image sharing sites where moving images that have been shot are shared over the Internet, users are increasingly wanting to shoot creative and interesting moving images. However, for a typical user who is unaccustomed to shooting moving images, shooting such creative and interesting moving images is not easy. Furthermore, editing tasks such as adding special effects to moving images, joining moving images together, and so on are complicated for such typical users, and thus pose problems when creating interesting moving images.

Japanese Patent Laid-Open No. 2002-218384 is known as a technique that makes it easier to join moving images together. According to a digital camera disclosed in Japanese Patent Laid-Open No. 2002-218384, when a continuous recording mode is set using a mode setting dial, a moving image that has been shot is additionally recorded in an existing file in which another moving image is recorded.

Meanwhile, functions that enable users to shoot moving images with added special effects through simple operations are also being proposed, primarily as smartphone apps. For example, a function for adding special color/tone conversion filtering effects to moving images, a function for shooting moving images of a predetermined short length multiple times and then automatically joining the moving images together, and so on have been proposed.

In addition, a technique that varies the playback speed of a moving image by recording the moving image while adjusting the framerate of the moving image based on an acceleration in a camera apparatus when shooting the moving image has also been proposed (see Japanese Patent Laid-Open No. 2006-262135).

When a plurality of moving images that have been joined together are played back consecutively, any special effects that have been added to the respective moving images will be noticed by a user in succession. The relationship between special effects from moving image to moving image can also be considered to affect how interesting the resulting moving image is, but the conventional techniques do not take this into consideration. Meanwhile, when multiple types of special effects are available, determining the special effect suited to each moving image individually and applying those special effects based on the results of the determinations increases processing loads.

With respect to techniques for varying the playback speed of a moving image, the technique disclosed in Japanese Patent Laid-Open No. 2006-262135 merely takes the acceleration of a camera apparatus into consideration, and does not consider a motion of a subject, the type of a primary subject among such subjects, or the like.

SUMMARY OF THE INVENTION

Having been conceived in light of such circumstances, the present invention provides a technique that controls whether or not to commonly add a special effect to a plurality of moving images in accordance with the type of the special effect. The present invention also provides a technique that enables the playback speed of a recorded moving image to be controlled based on conditions not taken into consideration conventionally.

According to a first aspect of the present invention, there is provided an image capturing apparatus comprising: an image capturing unit configured to capture a plurality of moving images; a control unit configured to add, to each of the plurality of moving images, a first special effect which is common to all of the plurality of moving images, and add, to each of one or more of the plurality of moving images, a second special effect which is determined on a moving image-by-moving image basis; and a generating unit configured to generate a joined moving image constituted by the plurality of moving images to which the special effects have been added by the control unit.

According to a second aspect of the present invention, there is provided a control method for an image capturing apparatus, the method comprising: a capturing step of capturing a plurality of moving images; a control step of adding, to each of the plurality of moving images, a first special effect which is common to all of the plurality of moving images, and adding, to each of one or more of the plurality of moving images, a second special effect which is determined on a moving image-by-moving image basis; and a generating step of generating a joined moving image constituted by the plurality of moving images to which the special effects have been added in the control step.

According to a third aspect of the present invention, there is provided an image capturing apparatus comprising: an image capturing unit configured to capture a moving image; a recording unit configured to record the moving image; a determining unit configured to determine a playback speed of the moving image based on at least one of a motion of a subject in the moving image and a type of a primary subject in the subject; and a control unit configured to control the image capturing unit and the recording unit so that a moving image played back at the playback speed determined by the determining unit is recorded.

According to a fourth aspect of the present invention, there is provided a control method for an image capturing apparatus, the method comprising: a capturing step of capturing a moving image; a recording step of recording the moving image; a determining step of determining a playback speed of the moving image based on at least one of a motion of a subject in the moving image and a type of a primary subject in the subject; and a control step of controlling the capturing step and the recording step so that a moving image played back at the playback speed determined in the determining step is recorded.

According to a fifth aspect of the present invention, there is provided a non-transitory computer readable storage medium which stores a program for causing a computer to execute a control method comprising: a capturing step of capturing a plurality of moving images; a control step of adding, to each of the plurality of moving images, a first special effect which is common to all of the plurality of moving images, and adding, to each of one or more of the plurality of moving images, a second special effect which is determined on a moving image-by-moving image basis; and a generating step of generating a joined moving image constituted by the plurality of moving images to which the special effects have been added in the control step.

According to a sixth aspect of the present invention, there is provided a non-transitory computer readable storage medium which stores a program for causing a computer to execute a control method comprising: a capturing step of capturing a moving image; a recording step of recording the moving image; a determining step of determining a playback speed of the moving image based on at least one of a motion of a subject in the moving image and a type of a primary subject in the subject; and a control step of controlling the capturing step and the recording step so that a moving image played back at the playback speed determined in the determining step is recorded.

Further features of the present invention will become apparent from the following description of exemplary embodiments (with reference to the attached drawings).

BRIEF DESCRIPTION OF THE DRAWINGS

FIGS. 4A to 4C are diagrams illustrating an example of a variable framerate effect.

FIG. 5 is a diagram illustrating a classification of various types of special effects.

FIG. 13 is a conceptual diagram illustrating a method for determining a weighting pattern for a variable framerate effect.

FIG. 14 is a diagram illustrating an example of the weighting pattern for the variable framerate effect.

FIG. 18 is a diagram illustrating an example of a joined moving image file to which various types of special effects have been added.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
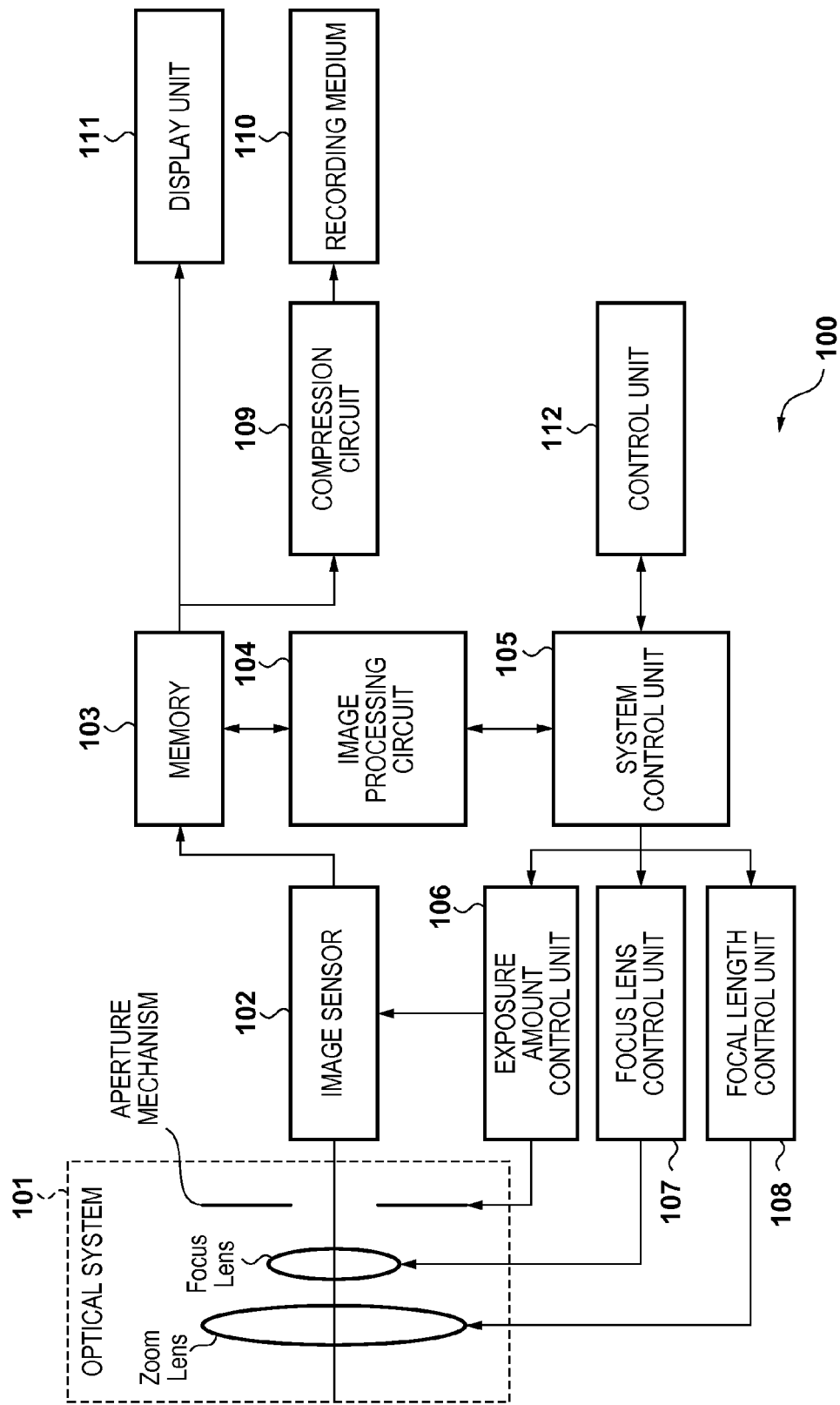
FIG. 1 is a block diagram illustrating the configuration of an image capturing apparatus 100 according to a first embodiment.

FIG. 1 is a block diagram illustrating the configuration of an image capturing apparatus 100 according to a first embodiment. In FIG. 1, 101 indicates an optical system including a plurality of lens groups and an aperture mechanism, specifically a focus lens, a zoom lens, and an aperture mechanism.

102 indicates an image sensor that is constituted by a CCD, a CMOS, or the like and includes an A/D converter that converts analog signals into digital signals. A surface of the image sensor 102 is covered by an RGB color filter such as a Bayer array or the like, for example, and is configured to be capable of capturing images in color. When a subject image is formed on the image sensor 102, image data (an image signal) is generated and stored in a memory 103.

103 indicates the memory, which is capable of holding image signals generated by the image sensor 102, data required for the overall processing performed by the image capturing apparatus 100, and so on. 104 indicates an image processing circuit, which carries out predetermined pixel interpolation processing, color conversion processing, and so on on the image signals held in the memory 103. The image processing circuit 104 carries out predetermined computational processing using captured image data, determines shooting conditions based on the obtained processing results, and communicates the shooting conditions to a system control unit 105. The image processing circuit 104 also has various types of functions such as image analysis, filtering processes, noise reduction processes, synthesizing processes, and so on, and includes a special effect processing determination unit that selects a special effect suited to a shot scene in accordance with an algorithm that will be described later.

105 indicates the system control unit that controls the image capturing apparatus 100 as a whole. The system control unit 105 oversees control of a shutter speed, the aperture mechanism, the focus lens, and the zoom lens in order to shoot an image under the shooting conditions determined by the image processing circuit 104. To do so, the system control unit 105 issues instructions to an exposure amount control unit 106, a focus lens control unit 107, and a focal length control unit 108.

106 indicates the exposure amount control unit, which carries out control to achieve an appropriate exposure amount by adjusting the aperture mechanism of the optical system 101 and an exposure time and shooting sensitivity of the image sensor 102. 107 indicates the focus lens control unit, which controls the focus lens of the optical system 101. 108 indicates the focal length control unit, which controls the zoom lens of the optical system 101 and changes a focal length in accordance with an instruction from the system control unit 105.

109 indicates a compression circuit, which compresses moving images according to a compression algorithm as exemplified by H.264/AVC, and converts the moving images into MPEG files, MOV files, or the like. The converted moving images are recorded into a recording medium 110.

111 indicates a display unit, which displays shot images generated by the image processing circuit 104 in an LCD of the image capturing apparatus 100, an external monitor, or the like. 112 indicates a control unit that accepts inputs from a user, and is equipped with buttons, a touch panel, and so on. The system control unit 105 determines and changes operations performed by the image capturing apparatus 100 based on user operations accepted by the control unit 112.

Figure 2:
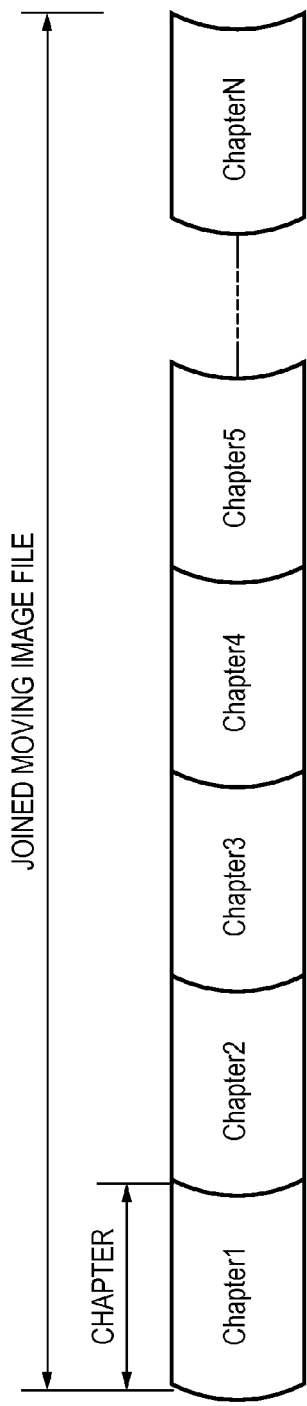
FIG. 2 is a conceptual diagram illustrating a joined moving image file containing a plurality of chapters generated by the image capturing apparatus 100.
Figure 3:
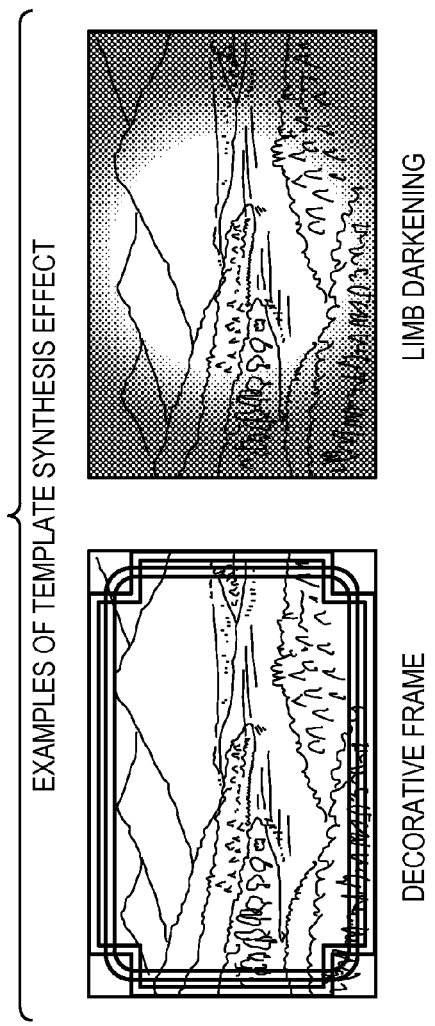
FIG. 3 is a diagram illustrating an example of a template synthesis effect.

Next, an overview of a moving image shooting process carried out by the image capturing apparatus 100 will be described with reference to FIGS. 2 to 5. The image capturing apparatus 100 carries out moving image shooting a plurality of times, joins the moving image data obtained from each instance of shooting together, and generates a single piece of moving image data. In FIG. 2, "chapter" indicates the moving image data obtained from a single instance of shooting, and "joined moving image file" indicates the single piece of moving image data obtained by joining a plurality of chapters together.

The image capturing apparatus 100 adds a variety of types of special effects to each moving image (each chapter) that has been shot, examples of which will be given hereinafter.
(1) color/tone conversion filtering effect
(2) template synthesis effect
(3) variable framerate effect
(4) afterimage effect "(1) color/tone conversion filtering effect" is a special effect that adds an atmosphere appropriate for the subject, the shot scene, and the like to the moving image by changing the coloration, contrast, and the like of the moving image using the image processing circuit 104. To rephrase, the "(1) color/tone conversion filtering effect" corresponds to control for applying a filter that converts at least one of the color and the tone. For example, the image processing circuit 104 can generate a high-contrast black-and-white moving image from a color moving image that has been shot.

"(2) template synthesis effect" is a special effect achieved by synthesizing each frame in a moving image with predetermined template data (called simply a "template" hereinafter) using the image processing circuit 104. To rephrase, the "(2) a template synthesis effect" corresponds to control for synthesis with a template. For example, depending on the image processing circuit 104, a decorative frame can be synthesized as illustrated in the left side of FIG. 3, a limb darkening effect can be added as illustrated in the right side of FIG. 3, and so on.

"(3) variable framerate effect" is a special effect that emphasizes a motion of a subject by slowing down or speeding up all or part of a moving image. To rephrase, the "(3) variable framerate effect" corresponds to control of the playback speed of the moving image. As a method for realizing this effect, recording a moving image at a framerate Frec that is Nx a playback framerate Fplay (Frec=N×Fplay) makes slow-motion playback at (1/N)×possible. Conversely, thinning the frames of a moving image shot at a framerate Frec equal to Fplay (Frec=Fplay) to 1/N makes fast-forward playback at Nx possible. In this manner, the playback speed can be controlled by controlling the shooting framerate and the recording framerate. Furthermore, using such a system, a moving image in which the playback speed changes, for example, from normal, to slow, and back to normal can be generated, as indicated in FIG. 4B. Specifically, in the case where the playback framerate Fplay is 30 (fps), the image capturing apparatus 100 thins out partial segments of data shot for several seconds at an Frec of 90 (fps) to 1/3, and records the data. This makes it possible to play back the unthinned segment in slow motion, at 1/3× the speed. Such a playback pattern, in which at least part of the moving image is played back in slow motion, is called a "slow-motion playback pattern". Likewise, a moving image in which the playback speed changes, for example, from normal, to fast, and back to normal can be generated, as indicated in FIG. 4C. Specifically, in the case where the playback framerate Fplay is 30 (fps), the image capturing apparatus 100 thins out a partial segment of data shot for several seconds at an Frec of 30 (fps) to 1/3, and records the data. This makes it possible to play back the thinned segments faster, at 3× the speed. Such a playback pattern, in which at least part of the moving image is played back faster, is called a "fast-forward playback pattern". In a case such as FIG. 4A, where Fplay=Frec and no thinning is carried out, the overall moving image is played back normally. Such a playback pattern, in which the overall moving image is played back at a normal speed, is called a "normal playback pattern".

"(4) afterimage effect" is a special effect that adds an afterimage to a moving subject using a recursive filter. To rephrase, the "(4) afterimage effect" corresponds to control for adding a residual image to a moving subject.

The image capturing apparatus 100 determines the details of each type of special effect based on the shot scene. For example, for the special effect type "(2) template synthesis effect", the image capturing apparatus 100 selects "decorative frame", "limb darkening", or "none" based on the shot scene. Details of the determination algorithm will be given later.

While there are some types of special effects for which applying the special effect commonly to all chapters will improve the quality of the joined moving image as a whole, there are other types of special effects that make the moving image more interesting when added on a chapter-by-chapter (moving image-by-moving image) basis in accordance with the shot scene. In the present embodiment, the former type of special effect is called a "special effect process A group", whereas the latter type of special effect is called a "special effect process B group". As indicated in FIG. 5, in the present embodiment, the "(1) color/tone conversion filtering effect" and "(2) template synthesis effect" correspond to the "special effect process A group", whereas the "(3) variable framerate effect" and "(4) afterimage effect" correspond to the "special effect process B group". As can be seen from FIG. 5, specific types of special effects (special effect groups) include a plurality of special effects, such as "decorative frame", "limb darkening", and so on in the case of "(2) template synthesis effect".

Note that the classifications in the "special effect process A group" and the "special effect process B group" are not limited to those shown in FIG. 5. Furthermore, the types of special effects, the special effects that can be selected from each type of special effect, and so on are not limited to those illustrated in FIG. 5. In the present embodiment, it is sufficient for there to be at least one type of special effect classified as the "special effect process A group" (a first special effect group) and at least one type of special effect classified as the "special effect process B group" (a second special effect group).

Next, the moving image shooting process carried out by the image capturing apparatus 100 will be described in detail with reference to FIG. 6. Note that unless otherwise specified, the processes in the steps of each flowchart in the present embodiment are realized by the system control unit 105 controlling the respective constituent elements of the image capturing apparatus 100 in accordance with a control program.

In step S601, the image capturing apparatus 100 analyzes the scene to be shot. Specifically, the image capturing apparatus 100 analyzes the brightness of the scene to be shot, whether or not the subject is a person, whether or not the subject is moving, and so on. This analysis is carried out based on information from various types of sensor such as an accelerometer (not shown), a gyrosensor (not shown), and the like, the image data generated by the image sensor 102, and so on. The analysis based on the image data can be carried out using the image processing circuit 104.

In step S602, the image capturing apparatus 100 determines whether or not a shooting instruction has been made by the user. The image capturing apparatus 100 repeats the scene analysis of step S601 until a shooting instruction is made. The process advances to step S603 when a shooting instruction is made.

In step S603, the image capturing apparatus 100 determines the special effect to be added to the shot moving image from the special effect process A group (see FIG. 5), based on a result of the scene analysis carried out in step S601. This determination process will be described in detail later.

In step S604, the image capturing apparatus 100 determines the special effect to be added to the shot moving image from the special effect process B group (see FIG. 5), based on a result of the scene analysis carried out in step S601. This determination process will be described in detail later.

Through the processes of step S603 and step S604, the special effects to be added to the chapters that will be shot are determined immediately before shooting of the chapters is started.

In step S605, the image capturing apparatus 100 carries out image capturing control for a moving image, and obtains a single frame of a moving image. Here, the image capturing apparatus 100 controls a driving frequency and exposure amount of the image capturing system in accordance with the details of the variable framerate effect determined in step S604. For example, in the case where a slow-motion playback effect is added to the moving image, the image capturing apparatus 100 controls the image sensor 102 to capture the image at a higher frequency than the playback framerate. Likewise, in the case where a fast-forward playback effect is added to the moving image, the image capturing apparatus 100 controls the image sensor 102 to capture the image at the same frequency as the playback framerate. The image capturing apparatus 100 also correctly sets the exposure amount, which is controlled by the aperture, shutter speed, and sensitivity, using the exposure amount control unit 106.

In step S606, the image capturing apparatus 100 adds the special effect of the special effect process A group determined in step S603 to the frame obtained in step S605. In step S607, the image capturing apparatus 100 adds the special effect of the special effect process B group determined in step S604 to the frame obtained in step S605. For example, the image capturing apparatus 100 adds a variable framerate to the moving image by controlling the shooting framerate and the recording framerate (thinning) so as to record a moving image played back at a playback speed corresponding to the variable framerate effect determined in step S604.

Figure 6:
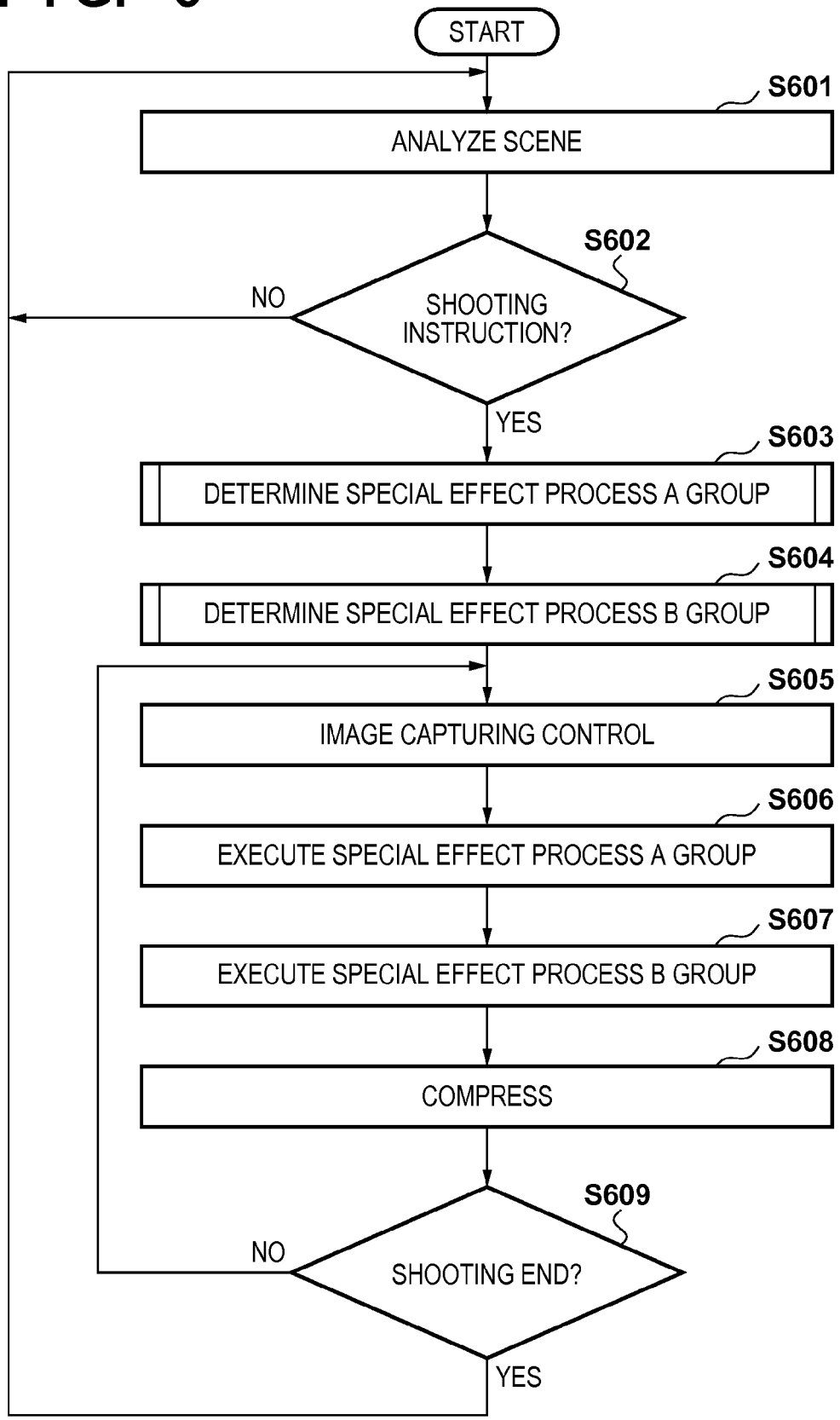
FIG. 6 is a flowchart illustrating a moving image shooting process performed by the image capturing apparatus 100.

Note that the order in which the special effects are added is not limited to that illustrated in FIG. 6. For example, the special effect of the special effect process B group may be added first, and the special effect of the special effect process A group may be added thereafter. Alternatively, some special effects of the special effect process A group may be added first, the special effect of the special effect process B group may then be added, and the remaining special effects of the special effect process A group may be added last.

In step S608, the image capturing apparatus 100 compresses the frame to which the special effect has been added and records that frame as a frame of the joined moving image file (see FIG. 2). Note that the image capturing apparatus 100 can join the chapters at any desired timing. For example, the image capturing apparatus 100 can generate the joined moving image file by generating individual moving image files for each chapter and then joining those moving image files together after a predetermined number of moving image files have been generated. Alternatively, the image capturing apparatus 100 may generate the joined moving image file by adding the frames of a new chapter to the chapter immediately previous thereto. Meanwhile, in the case of thinned recording such as that illustrated in FIGS. 4B and 4C, the image capturing apparatus 100 may discard the current frame rather than recording the frame in the case where that frame is a frame that is to be thinned.

In step S609, the image capturing apparatus 100 determines whether or not an instruction to end shooting has been made by the user. The image capturing apparatus 100 continues shooting the current chapter by repeating the processes from step S605 to step S608 until the instruction to end shooting is made. Alternatively, the image capturing apparatus 100 repeats the processes from step S605 to step S608 until a predetermined amount of time has passed from when the shooting of the moving image was started, and determines that the moving image shooting is to end in the case where the predetermined amount of time has passed.

The processing returns to step S601 from step S609 when the instruction to end shooting is made, and the image capturing apparatus 100 then analyzes the scene until the next shooting instruction is made. When the next shooting instruction is made, the image capturing apparatus 100 shoots the next chapter by once again executing the processing from step S603 on. However, with respect to the special effect process A group determination process of step S603, the same special effect as in the first (starting) chapter is determined when shooting the second and subsequent chapters.

Meanwhile, although not illustrated, after shooting a predetermined number of chapters, the image capturing apparatus 100 may shoot the first chapter of a different joined moving image file. For example, assume that the image capturing apparatus 100 is configured to generate a joined moving image file including four chapters. In this case, the processing returns to step S601 from step S609 when the image capturing apparatus 100 finishes shooting the fourth chapter, and when a shooting instruction is then made, the image capturing apparatus 100 determines the special effect of the special effect process A group for the first chapter of the next joined moving image file in step S603.

Next, the process for determining the special effect process A group, carried out in step S603 of FIG. 6, will be described in detail with reference to FIGS. 7 to 9. First, in step S701 of FIG. 7, the image capturing apparatus 100 determines whether or not the current chapter being shot is the first (starting) chapter of the joined moving image file. In the case where the chapter is the first chapter, the image capturing apparatus 100 executes a special effect process A group selection algorithm in step S702. In the case where the chapter is not the first chapter, in step S703, the image capturing apparatus 100 selects the same special effect as the special effect previously selected for the first chapter in step S702.

Figure 7:
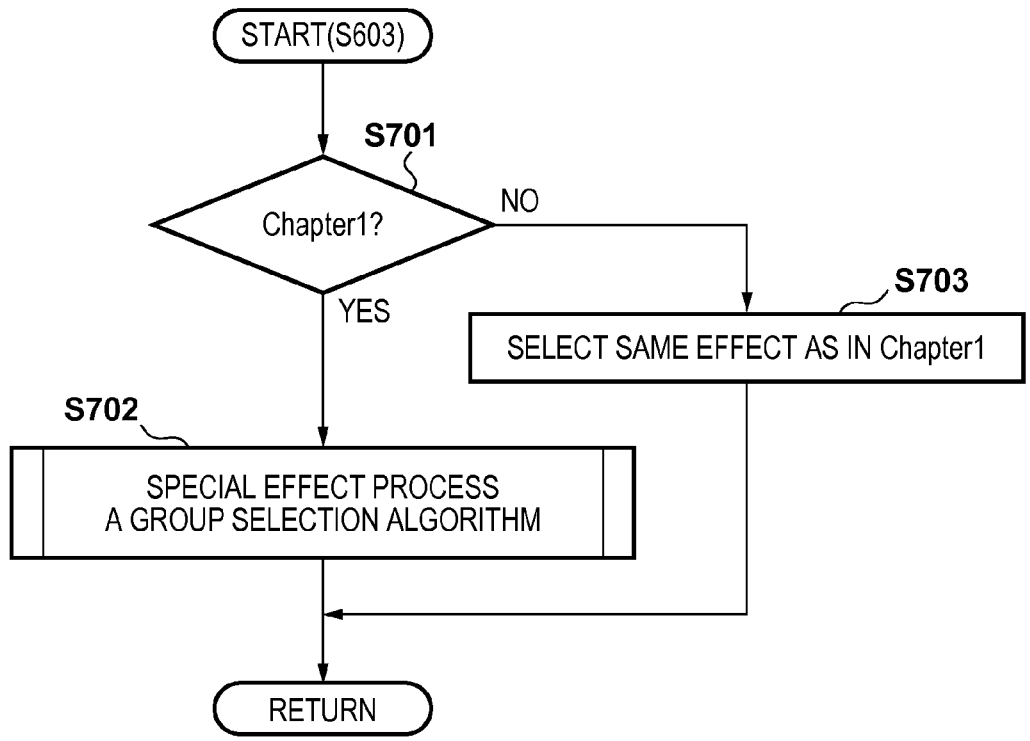
FIG. 7 is a flowchart illustrating details of process for determining a special effect process A group in step S603 of FIG. 6.

Through the processing of FIG. 7, the special effect of the special effect process A group can be added commonly to each chapter in the joined moving image file, which makes it possible to generate a moving image having a higher quality and sense of congruity. However, although not illustrated here, in the case where an instruction to change the filter effect has been received from the user, the image capturing apparatus 100 can select a filter with priority given to the user's desires (the user instruction) even for the second and subsequent chapters. In other words, in this case, the image capturing apparatus 100 adds, to a chapter corresponding to a user instruction, a special effect selected by the user instruction instead of the special effect selected in step S702 for the first chapter.

Figure 8:
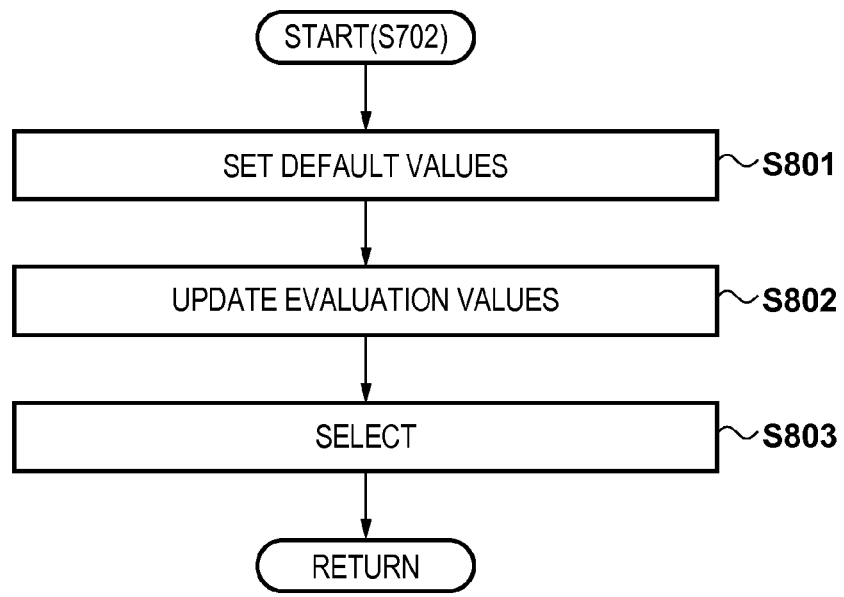
FIG. 8 is a flowchart illustrating details of a selection algorithm for the special effect process A group in step S702 of FIG. 7.
Figure 9:
FIG. 9 is a conceptual diagram illustrating updating of an evaluation value in the selection algorithm for the special effect process A group.

FIG. 8 is a flowchart illustrating details of the selection algorithm for the special effect process A group in step S702 of FIG. 7. Although the following describes the "(1) color/tone conversion filtering effect" as an example of a type of special effect belonging to the special effect process A group, the same algorithm can be used for other types of special effects (the "(2) template synthesis effect", for example).

The present embodiment assumes that the image capturing apparatus 100 can select M types of color/tone conversion filters. First, in step S801, the image capturing apparatus 100 sets all evaluation values x[m] for the M filters to a default value P according to the following Formula (1).

$$x[m]=P(m=0,1,2,\ldots,M-1) \quad (1)$$

In step S802, the image capturing apparatus 100 updates the evaluation values in accordance with the result of the scene analysis performed in step S601 of FIG. 6 (subject information, color distribution information of the shot image, and so on, for example). For example, in the case where the subjects include a person, the image capturing apparatus 100 executes an evaluation value computation process that, for example, raises the evaluation value of a filter suited to people and lowers the evaluation value of a filter not suited to people, executing the process multiple times based on the result of analyzing the scene to be shot. Through this, the final evaluation values x[m] vary depending on the scene to be shot, as illustrated in FIG. 9.

Then, in step S803, the image capturing apparatus 100 selects the filter having the highest evaluation value. Alternatively, the image capturing apparatus 100 can select a filter effect suited to the scene to be shot using a method such as selecting a single filter at random from among filters whose evaluation values are higher than a predetermined threshold.

Next, the process for determining the special effect process B group, carried out in step S604 of FIG. 6, will be described in detail with reference to FIGS. 10 to 17. Although the following describes the "(3) variable framerate effect" as an example of a type of special effect belonging to the special effect process B group, the same algorithm can be used for other types of special effects (the "(4) afterimage effect", for example).

First, in step S1001, the image capturing apparatus 100 obtains motion information of the image capturing apparatus 100 based on the result of analyzing the scene in step S601 of FIG. 6. The image capturing apparatus 100 itself is assumed to have a greater amount of a motion when the user is shooting a moving subject while tracking that subject than when the user is shooting a subject such as a flower, a landscape, or the like. Accordingly, the image capturing apparatus 100 detects whether or not the image capturing apparatus 100 is moving based on an output from a velocity sensor, an accelerometer, or the like provided in the image capturing apparatus 100. A method in which values output from the velocity sensor or the like are averaged over a predetermined amount of time, and the image capturing apparatus 100 is determined to be moving in the case where the average value is greater than a predetermined threshold Th_G and is determined to not be moving in the case where the average value is less than or equal to the threshold, can be considered as a method for determining whether or not the image capturing apparatus 100 is moving.

In step S1002, the image capturing apparatus 100 detects the type of the subject (the type of the primary subject among the subjects) based on the result of analyzing the scene in step S601 of FIG. 6. Generally speaking, faces can be detected in a screen through a method such as pattern matching, and the subject type is defined as "person" in the case where a face has been found. Meanwhile, a primary subject detection algorithm that determines whether or not a primary subject is present in a screen based on luminance or color area distribution, edge information, and the like in the screen is generally known. Accordingly, in the case where a face is not detected and a subject has been detected using the primary subject detection algorithm, the subject type is defined as "primary subject aside from person". In the case where a subject is not detected by either of the stated methods, the subject type is defined as "no primary subject".

Figure 11A:
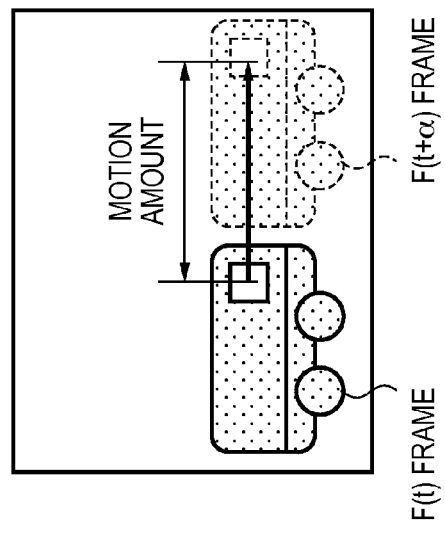
FIGS. 11A to 11C are conceptual diagrams illustrating a method for detecting a motion of a subject.
Figure 11B:
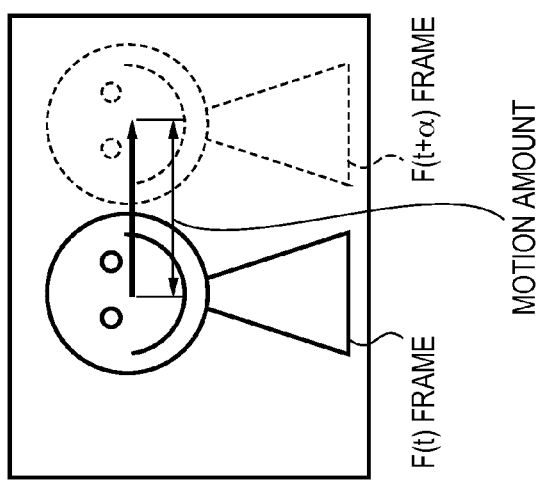
Figure 11C:
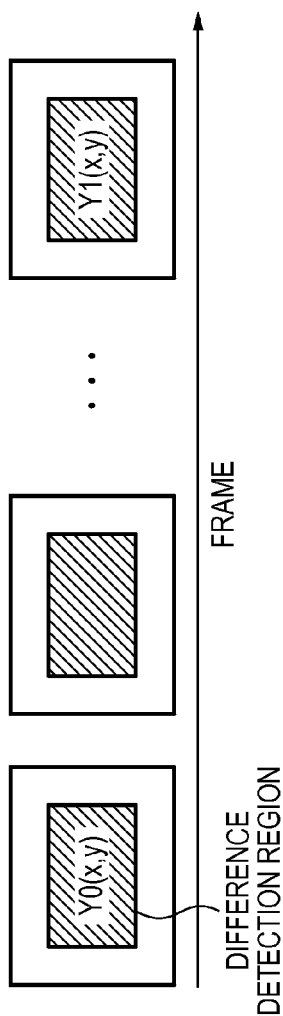

In step S1003, the image capturing apparatus 100 obtains the motion information of the subject based on the subject type detected in step S1002. As a method for detecting a motion of the subject, in the case where the subject type is "person", the subject is detected as moving in the case where, for example, an amount of change in a facial position between a frame at a time F(t) and a frame at F(t+α) is greater than a threshold Th_F, as illustrated in FIG. 11A. Meanwhile, in the case where the subject type is "primary subject aside from person", the subject is detected as moving in the case where, for example, an amount of change in a center position of a primary subject region between a frame at the time F(t) and a frame at F(t+α) is greater than a threshold Th_M, as illustrated in FIG. 11B. Furthermore, in the case where the subject type is "no primary subject", on a predetermined region in the screen, a sum S of inter-frame luminance difference values is calculated through the following Formula (2), and the subject is detected as moving in the case where the sum S is greater than a threshold Th_Sad, as illustrated in FIG. 11C.

$$S=\Sigma(Y1(x,y)-Y0(x,y)) \quad (2)$$

Y1: luminance of frame 1
Y0: luminance of frame 0

Figure 12:
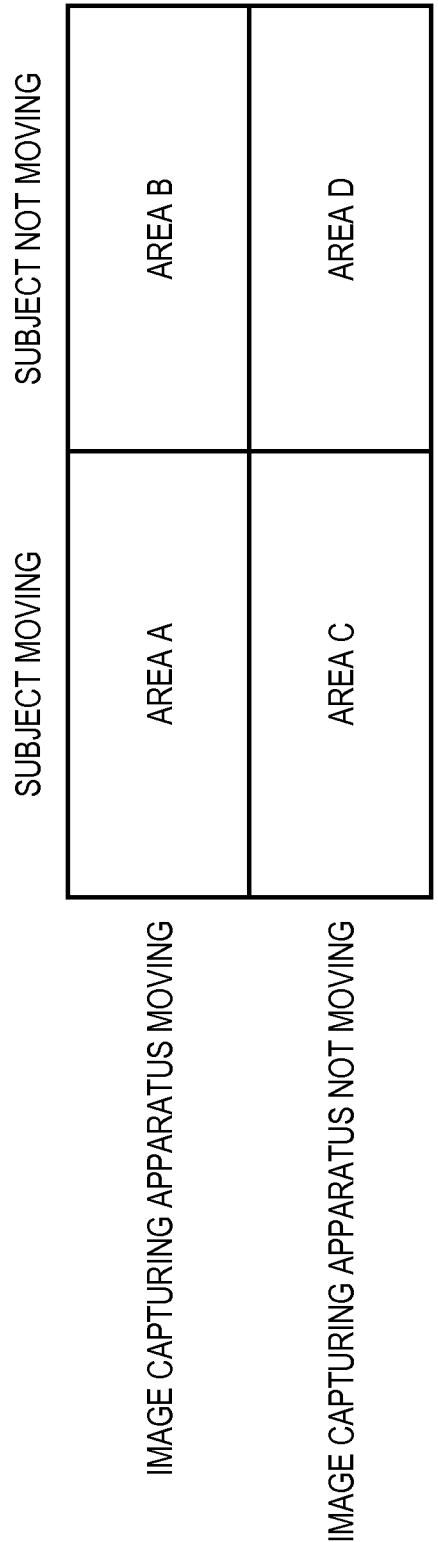
FIG. 12 is a conceptual diagram illustrating motion determination areas.
Figure 15:
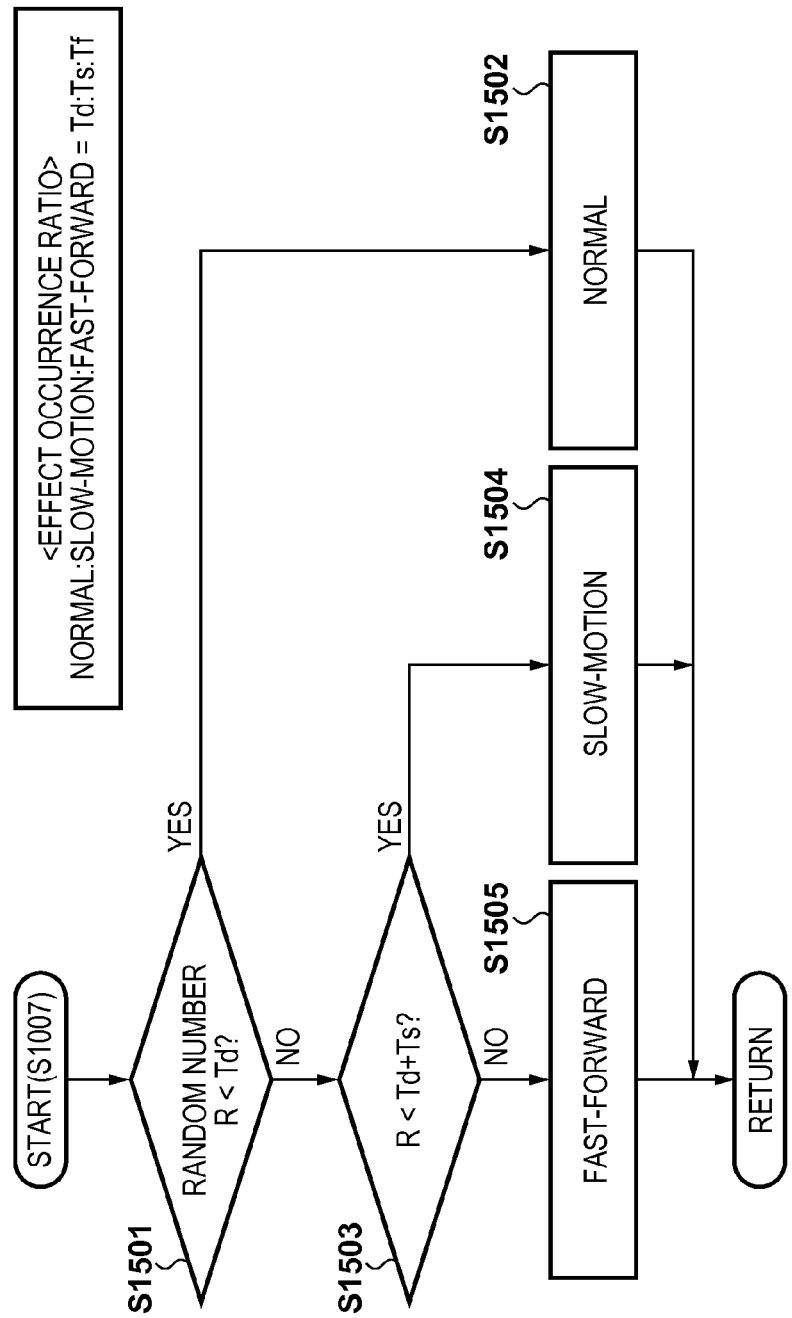
FIG. 15 is a flowchart illustrating details of a process carried out in step S1007 of FIG. 10.

Next, in step S1004, the image capturing apparatus 100 determines a motion detection area based on the motion information obtained in step S1001 and step S1003. As illustrated in FIG. 12, the motion detection area can be divided into four areas based on whether or not the image capturing apparatus 100 is moving and whether or not the subject is moving.

In step S1005, the image capturing apparatus 100 determines a weighting pattern for the variable framerate effect in accordance with a result of determining the area in step S1004 and the subject type detected in step S1002. Here, "weighting pattern" expresses a ratio at which the normal/slow-motion/fast-forward effects described with reference to FIGS. 4A to 4C occur. The weighting pattern is selected from among four patterns, illustrated in FIG. 14, based on the area and the subject type, as indicated in FIG. 13. Each pattern defines a probability that "normal" will be selected (a first probability), a probability that "slow-motion" will be selected (a second probability), and a probability that "fast-forward" will be selected (a third probability). For a pattern indicated as "normal—priority", for example, the probability that "normal" will be selected (the first probability) is set to be the highest so that "normal" will be selected with priority. Furthermore, for a pattern indicated as "normal—fixed", for example, the probability that "normal" will be selected (the first probability) is set to 100% so that "normal" will always be selected.

Although the example in FIG. 13 illustrates the image capturing apparatus 100 as determining the weighting pattern based on all of the motion of the image capturing apparatus 100, the motion of the subject, and the primary subject, the image capturing apparatus 100 may determine the weighting pattern based on only one of these. For example, based on whether or not the subject is moving, the image capturing apparatus 100 may be configured to select "slow-motion—priority" (in the case where the subject is moving) or "normal—priority" (in the case where the subject is not moving).

In step S1006, the image capturing apparatus 100 corrects the weighting pattern determined in step S1005 based on a chapter number of the current chapter being shot, the type of variable framerate effect that has been selected, and so on, as well as the focal length and so on of the image capturing apparatus 100. Four examples of methods for correcting the weighting will be given hereinafter for the case where "slow-motion—priority" has been selected in step S1005.

(i) In the case where the current chapter being shot is chapter 1, the ratio of "normal" is increased slightly and the other ratios are reduced.
(pre-correction)  normal:slow-motion:fast-forward=20:60:20
(post-correction) normal:slow-motion:fast-forward=30:40:30
→A special effect is less likely added to the starting chapter of the joined moving image file.

(ii) In the case where the current chapter being shot is a final chapter N, the ratios of "slow-motion" and "fast-forward" are increased slightly and the other ratios are reduced.
(pre-correction)  normal:slow-motion:fast-forward=20:60:20
(post-correction) normal:slow-motion:fast-forward=10:65:25
ΘA special effect is more likely added to the final (ending) chapter of the joined moving image file.

(iii) In the case where the current chapter being shot is a chapter aside from chapter 1 and the effect selected for chapter 1 is "slow-motion", the ratio of "slow-motion" is increased and the other ratios are reduced.
(pre-correction)  normal:slow-motion:fast-forward=20:60:20
(post-correction) normal:slow-motion:fast-forward=10:80:10
→The probability that similar special effects will be selected within the joined moving image file is increased.

(iv) In the case where the focal length of the image capturing apparatus 100 is greater than or equal to a pre-set focal length f_Th (greater than or equal to a threshold), hand shake will have an increased effect on the moving image, and thus the ratio of "fast-forward" is reduced and the other ratios are increased.
(pre-correction)  normal:slow-motion:fast-forward=20:60:20
(post-correction) normal:slow-motion:fast-forward=30:70:0

The weighting pattern corrections indicated above are measures taken with the aim of increasing a viewer's satisfaction in the case where the overall joined moving image file, in which a plurality of chapters have been linked, is viewed as a moving image. Note that the method for correcting the weighting patterns is not limited to the aforementioned four types, and a variety of weighting pattern correction methods can be considered according to the desires of the designer. More generally speaking, regarding the variable framerate effect, the image capturing apparatus 100 determines a special effect added to a predetermined chapter taking into consideration shooting parameters of that chapter, a position of the chapter in the joined moving image file, and a special effect added to the starting chapter. Note that the image capturing apparatus 100 need not take all of these elements into consideration, and may instead consider only some of those elements.

Finally, in step S1007, the image capturing apparatus 100 determines the details of the final variable framerate effect. Specifically, in step S1501 of FIG. 15, the image capturing apparatus 100 generates a normal random number R of [1, 100] and determines whether or not R<Td. Td is a probability of "normal" occurring. In the case where R<Td, the image capturing apparatus 100 selects "normal" for the variable framerate effect in step S1502. In the case where R≥Td, the image capturing apparatus 100 determines whether or not R<Td+Ts in step S1503. Ts is a probability of "slow-motion" occurring. In the case where R<Td+Ts, the image capturing apparatus 100 selects "slow-motion" for the variable framerate effect in step S1504. In the case where R≥Td+Ts, the image capturing apparatus 100 selects "fast-forward" for the variable framerate effect in step S1505.

Figure 10:
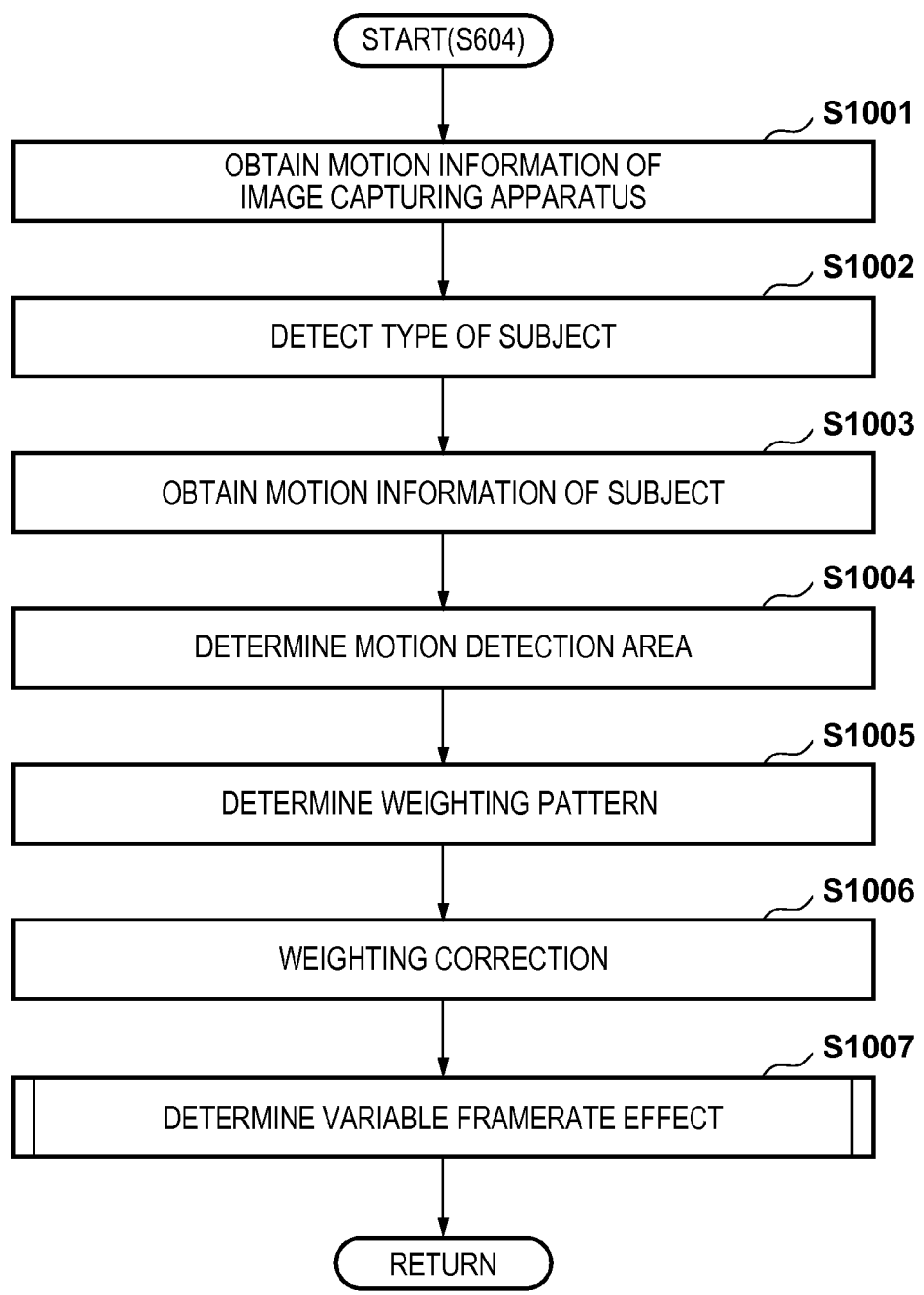
FIG. 10 is a flowchart illustrating details of process for determining a variable framerate effect of a special effect process B group in step S604 of FIG. 6.
Figure 16:
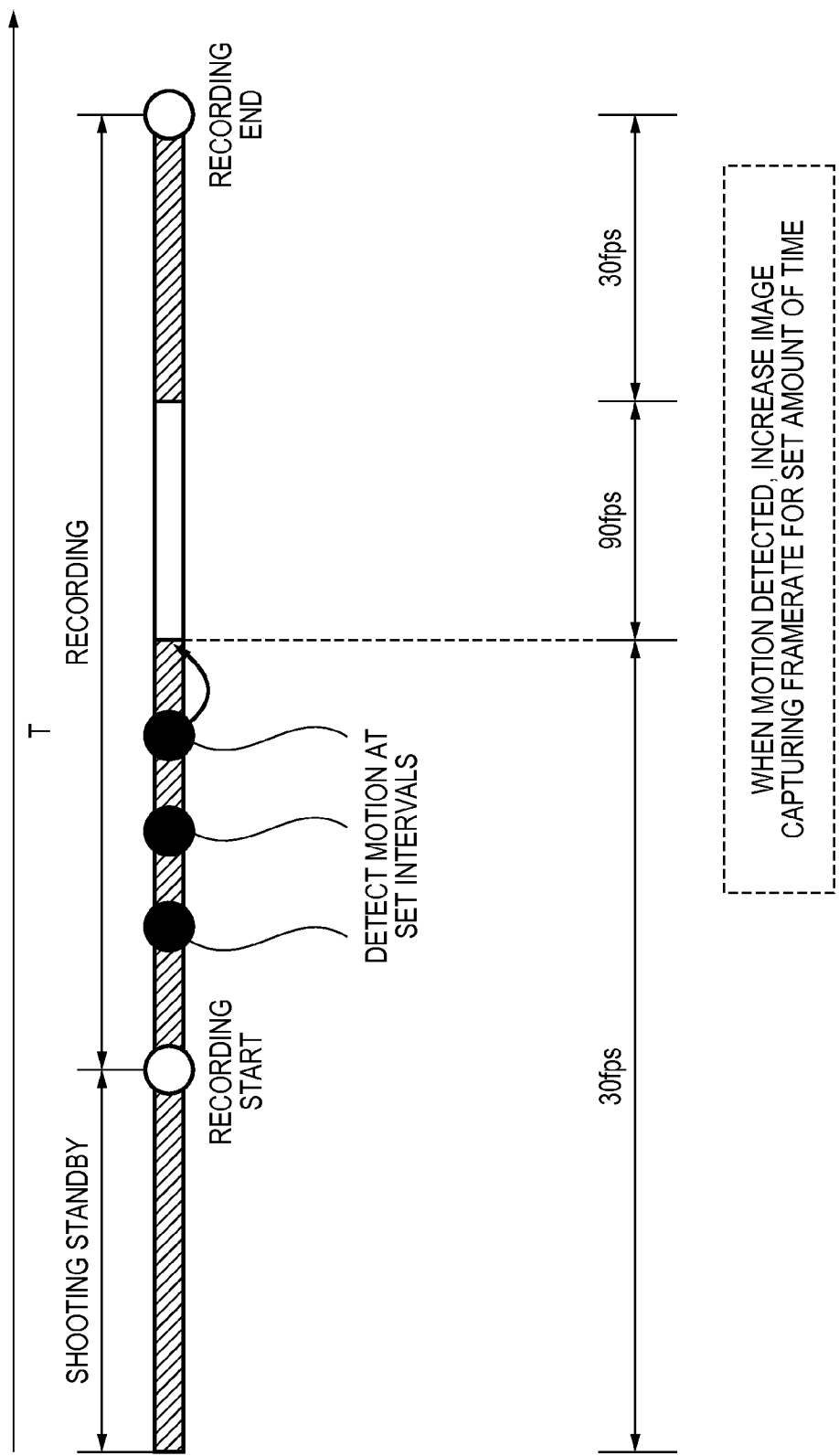
FIG. 16 is a diagram illustrating another example of a process for determining a variable framerate effect.
Figure 17:
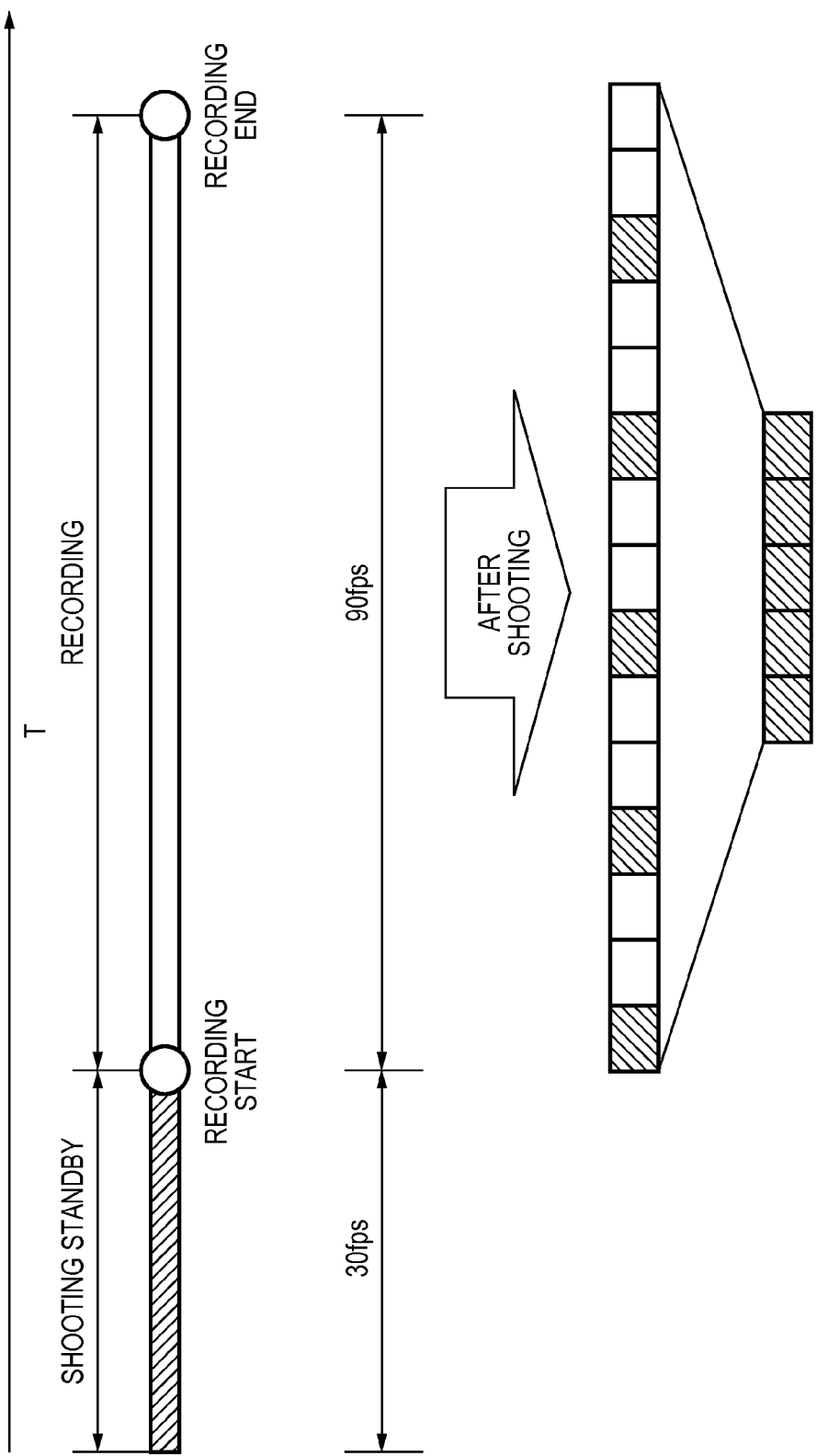
FIG. 17 is a diagram illustrating yet another example of a process for determining a variable framerate effect.

Based on the content of FIGS. 6 and 10, the details of the variable framerate effect are determined immediately before the start of shooting. However, the image capturing apparatus 100 may determine the details of the variable framerate effect at another timing instead. For example, as illustrated in FIG. 16, the image capturing apparatus 100 can analyze the motion information at set intervals during shooting, and in the case where a subject motion has been detected, increase the image capturing rate for a set period thereafter so as to add the "slow-motion" variable framerate effect to the moving image. Alternatively, as illustrated in FIG. 17, the image capturing apparatus 100 can shoot the moving image at the highest framerate, analyze a subject motion in the moving image after the shooting, and then add the variable framerate effect having predetermined details to the moving image.

Through the processing described thus far, a joined moving image file to which various types of special effects have been added based on the shot scenes is generated. FIG. 18 illustrates an example of a joined moving image file generated in this manner. The joined moving image file illustrated in FIG. 18 contains four chapters, and four types of special effects are added to each chapter. With respect to the "(1) color/tone conversion filtering effect" and "(2) template synthesis effect", which are special effects of types belonging to the special effect process A group, the same special effects are added commonly to all chapters. Meanwhile, with respect to the "(3) variable framerate effect" and "(4) afterimage effect", which are special effects of types belonging to the special effect process B group, the special effects are added on a chapter-by-chapter basis, based on the shot scene. As can be seen by the fact that the afterimage effect is determined to be "none" for chapter 1, the special effect process B group special effects are not necessarily added to all of the chapters. To rephrase, for the special effect process B group, the image capturing apparatus 100 adds a special effect determined on a chapter-by-chapter basis to each of one or more chapters among the plurality of chapters that constitute the joined moving image file. This makes it possible to generate an "interesting" moving image adaptively with respect to the shot scene, while at the same time maintaining a sense of congruity for the overall joined moving image file. Furthermore, because the special effect process A group special effects are added commonly to all chapters, the load of processing involved in determining the added special effects is lightened.

As described above, according to the first embodiment, regarding the special effect process A group, the image capturing apparatus 100 adds a common special effect to all chapters, and regarding the special effect process B group, the image capturing apparatus 100 adds a special effect determined on a chapter-by-chapter basis. In this manner, the image capturing apparatus 100 is configured to control whether or not to commonly add a special effect to a plurality of moving images in accordance with the type of the special effect. Through this, for some types of special effects, the special effects added to a plurality of moving images are applied commonly, which makes it possible to lighten the load of the processing involved in determining the special effects to be added. Furthermore, the image capturing apparatus 100 is configured to add a variable framerate effect to a moving image (that is, controlling the playback speed of a recorded moving image) based on conditions not conventionally taken into consideration, such as a subject motion, the type of a primary subject, and so on.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-181595, filed Sep. 5, 2014 and 2014-181596, filed Sep. 5, 2014, which are hereby incorporated by reference herein in their entirety.

What is claimed is:

1. An image capturing apparatus comprising:
an image sensor which captures a plurality of moving images; and
a processor which adds special effects to each of the plurality of moving images,
and generates a joined moving image constituted by the plurality of moving images to which the special effects have been added,
wherein the special effects include a color/tone conversion filtering effect corresponding to control for applying a filter that converts at least one of a color and a tone, and at least one of a variable framerate effect corresponding to control of a playback speed of a moving image and an afterimage effect corresponding to control for adding an afterimage to a moving subject using a recursive filter,
wherein the processor determines the special effects to be added based on analysis of at least one of the plurality of moving images captured by the image sensor, and
wherein the processor adds, to all of the plurality of moving images constituting the joined moving image, a common color/tone conversion filtering effect, and adds, to each of the plurality of moving images constituting the joined moving image, at least one of a variable framerate effect and an afterimage effect depending on each of the plurality of moving images.

2. The image capturing apparatus according to claim 1, wherein the processor determines the common color/tone conversion filtering effect based on a shot scene in a starting moving image in the joined moving image.

3. The image capturing apparatus according to claim 1, wherein
the processor receives a user instruction selecting a color/tone conversion filtering effect to be added to a predetermined moving image among the plurality of moving images,
wherein in a case where the user instruction has been received, the processor adds the color/tone conversion filtering effect selected by the user instruction to the predetermined moving image instead of the common color/tone conversion filtering effect.

4. The image capturing apparatus according to claim 1, wherein the processor determines the at least one of a variable framerate effect and an afterimage effect to be added to a predetermined moving image among the plurality of moving images based on a shot scene in the predetermined moving image.

5. The image capturing apparatus according to claim 1, wherein the processor determines the at least one of a variable framerate effect and an afterimage effect to be added to a predetermined moving image among the plurality of moving images based on at least one of a shooting parameter of the predetermined moving image, a position of the predetermined moving image in the joined moving image, and the at least one of a variable framerate effect and an afterimage effect added to a starting moving image in the joined moving image.

6. A control method for an image capturing apparatus, the method comprising:
capturing a plurality of moving images;
adding special effects to each of the plurality of moving images, generating a joined moving image constituted by the plurality of moving images to which the special effects have been added, wherein the special effects include a color/tone conversion filtering effect corresponding to control for applying a filter that converts at least one of a color and a tone, and at least one of a variable framerate effect corresponding to control of a playback speed of a moving image and an afterimage effect corresponding to control for adding an afterimage to a moving subject using a recursive filter, wherein the special effects to be added are determined based on analysis of at least one of the plurality of moving images captured by the image sensor, and wherein the adding step adds, to all of the plurality of moving images constituting the joined moving image, a common color/tone conversion filtering effect, and adds, to each of the plurality of moving images constituting the joined moving image, at least one of a variable framerate effect and an afterimage effect depending on each of the plurality of moving images.

7. A non-transitory computer readable storage medium which stores a program for causing a computer to execute a control method comprising:

capturing a plurality of moving images;

adding special effects to each of the plurality of moving images, generating a joined moving image constituted by the plurality of moving images to which the special effects have been added, wherein the special effects include a color/tone conversion filtering effect corresponding to control for applying a filter that converts at least one of a color and a tone, and at least one of a variable framerate effect corresponding to control of a playback speed of a moving image and an afterimage effect corresponding to control for adding an afterimage to a moving subject using a recursive filter, wherein the special effects to be added are determined based on analysis of at least one of the plurality of moving images captured by the image sensor, and wherein the adding step adds, to all of the plurality of moving images constituting the joined moving image, a common color/tone conversion filtering effect, and adds, to each of the plurality of moving images constituting the joined moving image, at least one of a variable framerate effect and an afterimage effect depending on each of the plurality of moving images.

* * * * *